United States Patent
Li et al.

(10) Patent No.: US 11,687,735 B2
(45) Date of Patent: Jun. 27, 2023

(54) METHOD, APPARATUS, DEVICE AND STORAGE MEDIUM FOR OUTPUTTING INFORMATION

(71) Applicant: Beijing Baidu Netcom Science and Technology Co., Ltd., Beijing (CN)

(72) Inventors: Mengzhao Li, Beijing (CN); Jun Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 31 days.

(21) Appl. No.: 17/201,398

(22) Filed: Mar. 15, 2021

(65) Prior Publication Data
US 2021/0200964 A1 Jul. 1, 2021

(30) Foreign Application Priority Data
Jul. 15, 2020 (CN) .......................... 202010678775.X (51) Int. Cl.
*G06F 40/51* (2020.01)
*G06F 16/332* (2019.01)
*G06F 16/903* (2019.01)
*G06F 40/55* (2020.01)

(52) U.S. Cl.
CPC .......... *G06F 40/51* (2020.01); *G06F 16/3329* (2019.01); *G06F 16/90344* (2019.01); *G06F 40/55* (2020.01)

(58) Field of Classification Search
CPC ................. G06F 40/51; G06F 16/3329; G06F 16/90344; G06F 40/55
See application file for complete search history.

(56) References Cited

U.S. PATENT DOCUMENTS

| | | |
|---|---|---|
| 2002/0091509 A1 | 7/2002 | Zoarez |
| 2009/0192783 A1 | 7/2009 | Jurach, Jr. |
| 2012/0232882 A1* | 9/2012 | Zhang ................... G06F 40/45 704/8 |
| 2012/0310624 A1* | 12/2012 | Wong ..................... G06F 40/40 704/4 |
| 2013/0173247 A1* | 7/2013 | Hodson ................. G06F 40/40 704/4 |
| 2018/0095950 A1* | 4/2018 | Phadke ................ G06F 40/205 |

FOREIGN PATENT DOCUMENTS

JP 2010152420 A 7/2010

OTHER PUBLICATIONS

Silva, Example BAsed MAchine Translation for English-Sinhala Translations, 2008, whole document (Year: 2008).*
European Patent Office, Extended European Search Report for Application No. 21162585.0, dated Sep. 3, 2021 (10 pages).

* cited by examiner

*Primary Examiner* — Sonia L Gay
(74) *Attorney, Agent, or Firm* — Ice Miller LLP; Justin Swindells (57) ABSTRACT

A method, an apparatus, a device and a storage medium for outputting information are provided. The method includes: acquiring a to-be-translated sentence; determining a foreign language sentence matching the to-be-translated sentence from a preset set of sentence pairs, where the set of sentence pairs includes local language sentences and corresponding foreign language sentences; determining a target foreign language sentence of the to-be-translated sentence according to the to-be-translated sentence and the determined foreign language sentence; and outputting the target foreign language sentence.

17 Claims, 6 Drawing Sheets

METHOD, APPARATUS, DEVICE AND STORAGE MEDIUM FOR OUTPUTTING INFORMATION

CROSS-REFERENCE TO RELATED APPLICATIONS

This application claims the priority of Chinese Patent Application No. 202010678775.X, titled "METHOD, APPARATUS, DEVICE AND STORAGE MEDIUM FOR OUTPUTTING INFORMATION", filed on Jul. 15, 2020, the content of which is incorporated herein by reference in its entirety.

TECHNICAL FIELD

The present disclosure relates to the field of computer technology, in particular, to the fields of web page processing, natural language processing and cloud computing, and more in particular, to a method, apparatus, device and storage medium for outputting information.

BACKGROUND

With the development of smart devices, smart operating systems are becoming increasingly diverse. Smart devices integrated with these systems are being used by an increasing number of users. Users use these devices for daily activities, such as gaming, socialization and reading.

With the increasing sales of smart devices, foreign users start to use these products, thus the web pages providing these products need to be internationalized. The content that needs to be translated includes: the front-end display copywriting rendered by JavaScript and back-end error messages and returned data.

SUMMARY

A method, apparatus, device and storage medium are provided.

According to a first aspect, a method for outputting information is provided, and the method includes: acquiring a to-be-translated sentence; determining a foreign language sentence matching the to-be-translated sentence from a preset set of sentence pairs, where the set of sentence pairs includes local language sentences and corresponding foreign language sentences; determining a target foreign language sentence of the to-be-translated sentence according to the to-be-translated sentence and the determined foreign language sentence; and outputting the target foreign language sentence.

According to a second aspect, an apparatus for outputting the information is provided, and the apparatus includes: an acquisition unit configured to acquire a to-be-translated sentence; a matching unit configured to determine a foreign language sentence matching the to-be-translated sentence from a preset set of sentence pairs, where the set of sentence pairs includes local language sentences and corresponding foreign language sentences; a determining unit configured to determine a target foreign language sentence of the to-be-translated sentence according to the to-be-translated sentence and the determined foreign language sentence; and an output unit configured to output the target foreign language sentence.

According to a third aspect, an electronic device for outputting the information is provided, the electronic device includes: at least one processor; and a memory communicating with the at least one processor, where the memory stores instructions executable by the at least one processor, and the instructions, when executed by the at least one processor, cause the at least one processor to execute the method as described in the first aspect.

According to a fourth aspect, a non-transitory computer readable storage medium storing computer instructions is provided, and the computer instructions cause a computer to execute the method as described in the first aspect.

It should be appreciated that the content described in this section is not intended to identify the key or critical features of the embodiments of the present disclosure, nor is it intended to limit the scope of the present disclosure. The other features of the present disclosure will become easy to understand through the following description.

BRIEF DESCRIPTION OF THE DRAWINGS

The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, where various details of the embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
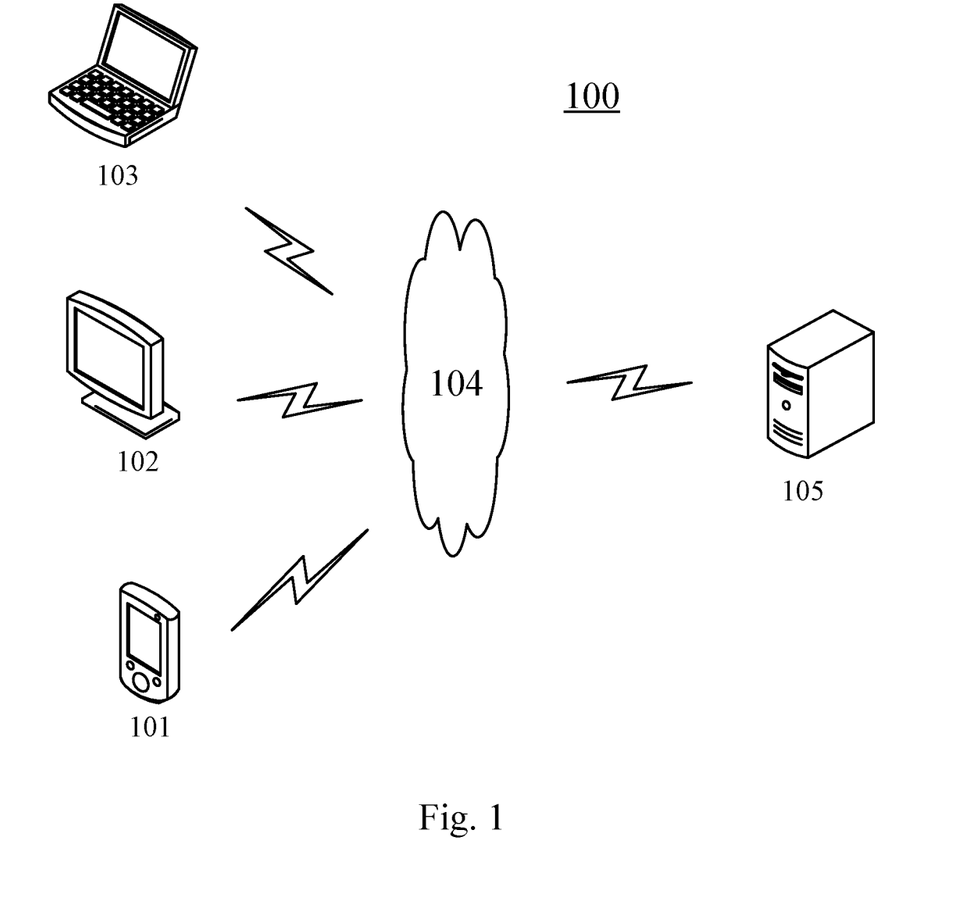
FIG. 1 is an example system architecture diagram in which an embodiment of the present disclosure may be applied.

FIG. 1 shows an example system architecture 100 in which an embodiment of a method for outputting information or an apparatus for outputting information of the present disclosure may be applied.

As shown in FIG. 1, the system architecture 100 may include terminal devices 101, 102 and 103, a network 104 and a server 105. The network 104 serves as a medium for providing a communication link between the terminal devices 101, 102 and 103 and the server 105. The network 104 may include various types of connections, such as wired or wireless communication links, or optical fiber cables.

A user may use the terminal devices 101, 102 and 103 to interact with the server 105 through the network 104 to receive or send messages. Various communication client applications, such as web browsing applications, shopping applications, social platform applications and voice recognition applications, may be installed on the terminal devices 101, 102 and 103.

The terminal devices 101, 102 and 103 may be hardware or software. When the terminal devices 101, 102 and 103 are hardware, the hardware may be various electronic devices, including but not limited to a smart phone, a tablet computer, an electronic book reader, an on-board computer, a laptop computer and a desktop computer. When the terminal devices 101, 102 and 103 are software, the software may be installed in the electronic device, and may be implemented as multiple software pieces or software modules (such as for providing distributed services), or as a single software piece or software module. It is not specifically limited herein.

The server 105 may be a server providing various services, such as a background server translating a sentence in a web page returned on the terminal devices 101, 102 and 103. The background server may acquire a web page returned to a user, translate a sentence in the web page, and feed back the translated foreign language sentence to the terminal devices 101, 102 and 103.

It should be noted that the server 105 may be hardware or software. When the server 105 is hardware, the hardware may be implemented as a distributed server cluster composed of multiple servers, or as a single server. When the server 105 is software, the software may be implemented as multiple software pieces or software modules (such as for providing distributed services), or as a single software piece or software module. It is not specifically limited herein.

It should be noted that the method for outputting the information provided by the embodiment of the present disclosure is generally executed by the server 105. Correspondingly, the apparatus for outputting the information is generally provided in the server 105.

It should be appreciated that the number of the terminal devices, the network and the server in FIG. 1 is merely illustrative. Any number of terminal devices, networks and servers may be provided according to actual requirements.

Figure 2:
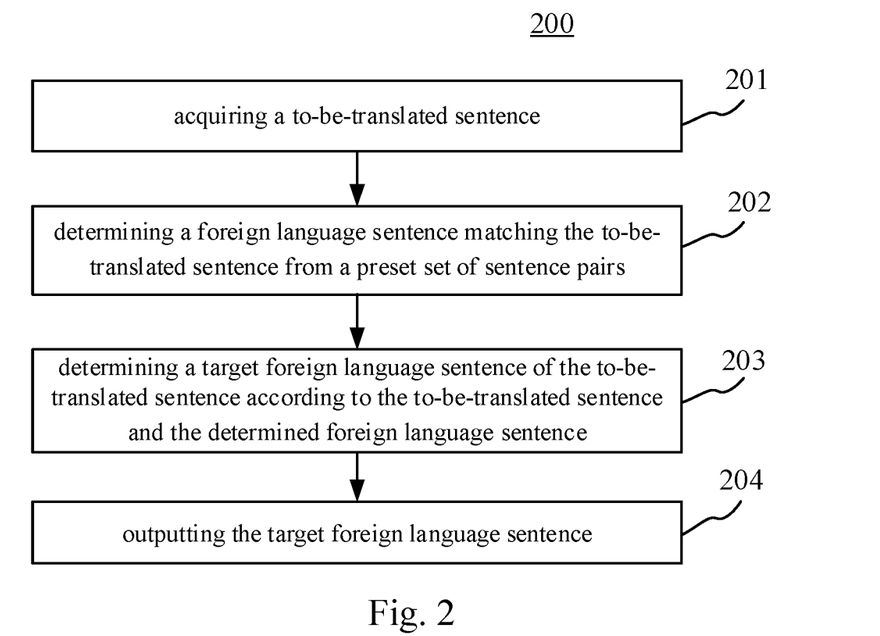
FIG. 2 is a flowchart of an embodiment of a method for outputting information according to the present disclosure.

Further referring to FIG. 2, FIG. 2 shows a flow 200 of an embodiment of a method for outputting information according to the present disclosure. The method for outputting the information of this embodiment includes steps 201 to 204.

Step 201 includes acquiring a to-be-translated sentence.

In this embodiment, the execution body of the method for outputting the information (such as the server 105 shown in FIG. 1) may acquire a to-be-translated sentence in various ways. The to-be-translated sentence may be sent to the execution body by a user, or may be returned to the execution body by a search engine. The to-be-translated sentence may include at least one local language (e.g., Chinese) character.

Step 202 includes determining a foreign language sentence matching the to-be-translated sentence from a preset set of sentence pairs.

After acquiring the to-be-translated sentence, the execution body may determine a foreign language sentence matching the to-be-translated sentence from a preset set of sentence pars. The set of sentence pairs may include multiple sentence pairs, and each sentence pair includes a local language sentence and its corresponding foreign language sentence, and the foreign language sentence may include multiple sentences, such as an English sentence, a Russian sentence and a German sentence. The execution body may compare the to-be-translated sentence with local language sentences in the set of sentence pairs to determine a local language sentence matching the to-be-translated sentence. During the comparison, the execution body may calculate similarities between the to-be-translated sentence and local language sentences in the set of sentence pairs, use the local language sentence with the largest similarity as the local language sentence matching the to-be-translated sentence, and use a foreign language sentence corresponding to the local language as the foreign language sentence matching the to-be-translated sentence.

Step 203 includes determining a target foreign language sentence of the to-be-translated sentence according to the to-be-translated sentence and the determined foreign language sentence.

In this embodiment, the to-be-translated sentence may contain variables, and values of these variables change. However, the values of variables in the foreign language sentence in the set of sentence pairs are fixed or blank. Therefore, the execution body may replace the determined variables in the foreign language sentence with the variables in the to-be-translated sentence to obtain a foreign language sentence. For example, the to-be-translated sentence is "B+'in'+A+'Data format error'", where "A" and "B" are variables. In JavaScript, a variable is a container for storing a data value. The matched foreign language sentence is "Data in the C of D format error", where "C" and "D" are also variables. In this case, the execution body may replace "C" and "D" in the foreign language sentence with "B" and "A" to obtain the target foreign language sentence "Data in the B of A format error".

Step 204 includes outputting the target foreign language sentence.

After obtaining the target foreign language sentence, the execution body may output the target foreign language sentence for browsing by a user.

Figure 3:
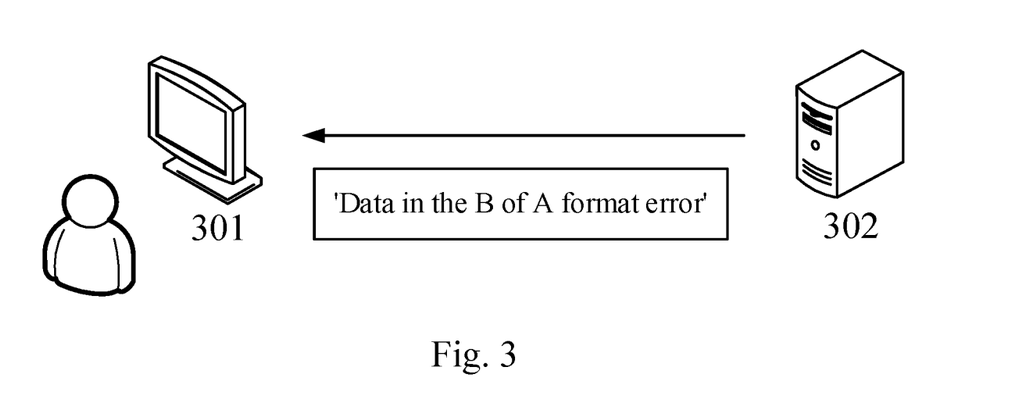
FIG. 3 is a schematic diagram of an application scenario of the method for outputting the information according to the present disclosure.

Further referring to FIG. 3, FIG. 3 shows a schematic diagram of an application scenario of the method for outputting the information according to the present disclosure. In the application scenario of FIG. 3, a user browses a web page of a product through a browser of a terminal 301, but an error occurs during the browsing process. A server 302 may use a sentence in the web page returned by the browser as the to-be-translated sentence. The to-be-translated sentence is "A+'中'+B+'的数据 格式错误'", and the target foreign language sentence "format error of data in the B of A" is obtained after the processing of the steps 202 to 203. The server 302 may display the target foreign language sentence in the web page returned by the browser.

According to the method for outputting the information provided by the embodiment of the present disclosure, the foreign language sentence matching the to-be-translated sentence is determined from the set of sentence pairs, and the foreign language sentence is optimized according to the to-be-translated sentence, so that the obtained target translation sentence is more fluent.

Figure 4:
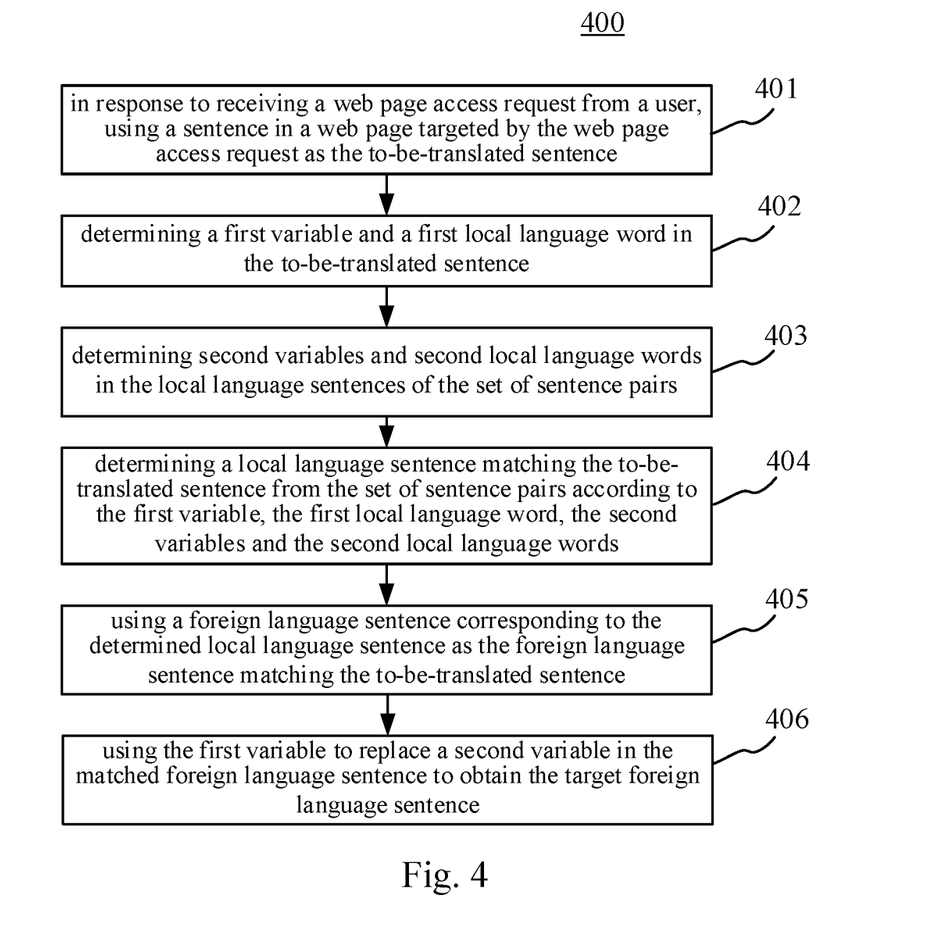
FIG. 4 is a flowchart of another embodiment of the method for outputting the information according to the present disclosure.

Further referring to FIG. 4, FIG. 4 shows a flow 400 of another embodiment of the method for of the information according to the present disclosure. As shown in FIG. 4, the method for outputting the information in this embodiment may include steps 401 to 406.

Step 401 includes, in response to receiving a web page access request from a user, using a sentence in a web page targeted by the web page access request as the to-be-translated sentence.

In this embodiment, the execution body may receive a web page access request from a user. The web page access request is used to request access to a certain web page. The execution body may use a sentence in a web page targeted by the web page access request as the to-be-translated sentence.

Step 402 includes determining a first variable and a first local language word in the to-be-translated sentence.

The execution body may determine a variable and a local language word in the to-be-translated sentence, record the variable as a first variable, and record the local language word as a first local language word. When determining variables, the execution body may determine the variables in the sentence according to a computer editing language. For JavaScript, parameters that are not represented in single quotation marks may be considered as the variables. The execution body may recognize a local language word in the to-be-translated sentence through an existing local language recognition algorithm.

Step 403 includes determining second variables and second local language words in the local language sentences of the set of sentence pairs.

Similarly, the execution body may determine variables and local language words in the local language sentences of the set of sentence pairs, record the variables as second variables, and record the local language words as second local language words. In some specific applications, the execution body may analyze the local language sentences only once, and then save the obtained second variables and the second local language words for next use.

Step 404 includes determining a local language sentence matching the to-be-translated sentence from the set of sentence pairs according to the first variable, the first local language word, the second variables and the second local language words.

After determining the first variable, the first local language word, the second variables and the second local language words, the execution body may determine a local language sentence matching the to-be-translated sentence from the set of sentence pairs. Specifically, the execution body may use a local language sentence in which the second local language word is the same as the first local language word as the local language sentence matching the to-be-translated sentence.

In some alternative implementations of this embodiment, the step 404 may be specifically implemented by the following steps (not shown in FIG. 4): determining first location information of the first variable in the to-be-translated sentence; determining second location information of the second variables in the local language sentences of the set of sentence pairs; and determining the local language sentence matching the to-be-translated sentence from the set of sentence pairs according to the first location information, the second location information, the first local language word and the second local language words.

In this embodiment, the execution body may determine the first location information of the first variable in the to-be-translated sentence. The first position information may be a value for representing the distance between the first variable and the first character of the to-be-translated sentence. Similarly, the execution body may determine second location information of the second variables in the local language sentences of the set of sentence pairs; and then the execution body may determine the local language sentence matching the to-be-translated sentence from the set of sentence pairs according to the first location information, the second location information, the first local language word and the second local language words. Specifically, the execution body may determine the local language sentence in which a second local language word is the same as the first local language word and second position information is the same as the first position information in the local language sentences of the set of sentence pairs.

Step 405 includes using a foreign language sentence corresponding to the determined local language sentence as the foreign language sentence matching the to-be-translated sentence.

After determining the local language sentence, the execution body may use a foreign language corresponding to the local language sentence as the foreign language sentence matching the to-be-translated sentence.

Step 406 includes using the first variable to replace a second variable in the matched foreign language sentence to obtain the target foreign language sentence.

The execution body may use the first variable in the to-be-translated sentence to replace a second variable in the matched foreign language sentence to obtain the target foreign language sentence.

According to the method for outputting the information provided by the embodiment of the present disclosure, the foreign language sentence matching the to-be-translated sentence may be accurately determined through the position of the variable and the local language word in the to-be-translated sentence, and the positions of the variables and the local language words in the local language sentences of the set of sentence pairs, thereby improving the accuracy of translation.

Figure 5:
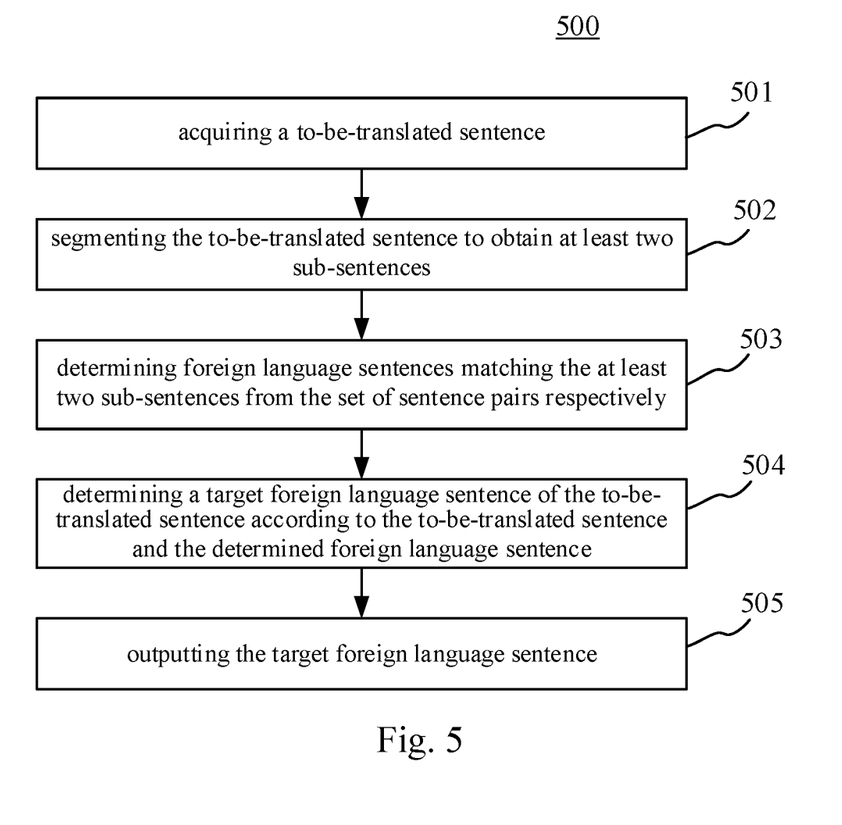
FIG. 5 is a flowchart of yet another embodiment of the method for outputting the information according to the present disclosure.

Further referring to FIG. 5, FIG. 5 shows a flow 500 of yet another embodiment of the method for outputting the information according to the present disclosure. In this embodiment, the execution body may include steps 501 to 505.

Step 501 includes acquiring a to-be-translated sentence.

Step 502 includes segmenting the to-be-translated sentence to obtain at least two sub-sentences.

In this embodiment, after acquiring a to-be-translated sentence, the execution body may segment the to-be-translated sentence to obtain at least two sub-sentences. Specifically, the execution subject may segment the to-be-translated sentence according to various symbols. The symbols may include, but are not limited to: ':', ',', '¦ ¦', '.', 'o', ',', ';', ':' and bracket type symbols '( )', '( )', '{ }', '⌈ ⌋', '[ ]', '< >'. For example, the to-be-translated sentence is "between chart ⌊A⌋ a circular dependency is formed, please change dependency configuration!", sub-sentences obtained by segmentation may include "between chart", "a circular dependency is formed" and "please change dependency configuration".

Step 503 includes determining foreign language sentences matching the at least two sub-sentences from the set of sentence pairs respectively.

In this embodiment, the execution body may determine foreign language sentences matching the at least two sub-sentences from the set of sentence pairs respectively. The determining method may be determined by the method shown in the steps 402 to 405.

Step 504 includes determining a target foreign language sentence of the to-be-translated sentence according to the to-be-translated sentence and the determined foreign language sentence.

In this embodiment, after obtaining the foreign language sentences matching the sub-sentences, the execution body may splice the foreign language sentences according to the positions of the sub-sentences in the to-be-translated sentence. Meanwhile, a variable in the to-be-translated sentence is inserted into the spliced foreign language sentence to obtain the target foreign language sentence.

Step 505 includes outputting the target foreign language sentence.

It should be noted that the method of this embodiment may be used, when a matched foreign language sentence is not determined by using the embodiment shown in FIG. 4. In this case, alternatively the segmentation in the step 502 may be performed on the to-be-translated sentence according to the first variable to obtain the at least two sub-sentences.

For example, a to-be-translated sentence is "'in SQL'+((B+'line)''in the sentence'A:)+'there is an illegal keyword'+C". Then sub-sentences may include "in SQL", "in the sentence", "line" and "there is an illegal keyword".

According to the method for outputting the information provided by the embodiment of the present disclosure, the accuracy of the translation may be further improved.

Figure 6:
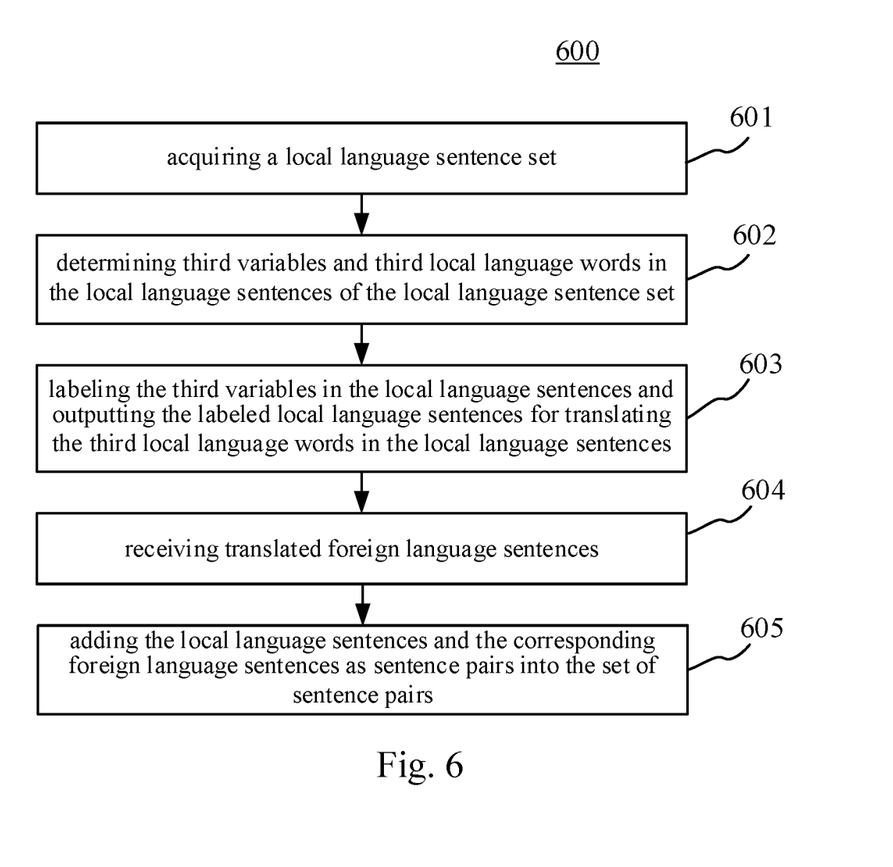
FIG. 6 is a flowchart of determining a set of sentence pairs in the method for outputting the information according to the present disclosure.

Further referring to FIG. 6, FIG. 6 shows a flow 600 of determining a set of sentence pairs in the method for outputting the information according to the present disclosure. As shown in FIG. 6, in this embodiment, the set of sentence pairs may be obtained by steps 601 to 605.

Step 601 includes acquiring a local language sentence set.

In this embodiment, the execution body may first acquire a local language sentence set local language sentences of the local language sentence set may include a sentence displayed in a front-end web page and a sentence returned by a back-end.

Step 602 includes determining third variables and third local language words in the local language sentences of the local language sentence set.

After obtaining the local language sentence set, the execution body may determine third variables and third local language words in the local language sentences of the local language sentence set.

Step 603 includes labeling the third variables in the local language sentences and outputting the labeled local language sentences for translating the third local language words in the local language sentences.

Specifically, after determining the variables in the to-be-translated sentence, the variables may be labeled with symmetrical symbols first. The symmetrical symbols may include "[" and "]", "<" and ">", "⌈" and "⌉". It should be appreciated that the symmetrical symbols may be symbols that are not used in computer programming languages. For example, the to-be-translated sentence is "'data format error of'+B+'in'+A+". "⌈" and "⌉" are used to mark the variables to obtain "'data format error of ⌈'+B'⌋ in '+⌈'+A+'⌉'".

After labeling the variables, the variables may be replaced with preset symbols and then other to-be-translated words are extracted. Still taking the above sentence as an example, using [%%0%%] to represent the variable A and using [%%1%%] to represent the variable B. Then, the local language words in the part quoted by the single quotation marks are extracted to obtain the sentence "'data format error of [%%1%%] in [%%0%%]'". The execution may output the sentence to a translator, so that the translator translates the third local language words in the local language sentences.

In some cases, there is a variable nesting in the to-be-translated sentence. In these cases, after labeling the variables, the execution body starts matching from the closest "⌈" and "⌋", and recursively performs matching until there is no "⌈" and "⌋". Specially, the to-be-translated sentence is "'in SQL'+(A?(B+'line)':")+'there is an illegal keyword'+C". It can be seen that, in addition to the variable C, the A?(B+'line)':" is a conditional operator sentence, because the execution result depends on whether B is true, and the specific value may be determined only at the time of execution, so that the whole operator sentence may be considered as a variable, and special symbols "⌈" and "⌋" are added at the both ends. There is also a variable B inside the variable, and the special symbols are also added at the both ends to obtain a sentence 1 "'in SQL⌈'+(A?(⌈B+'⌋ line)':")+'⌋ there is an illegal keyword ⌈'+C+'⌋'".

It can be seen that in the sentence 1, there are nested "⌈" and "⌋" structures. When extracting the to-be-translated words, the execution body starts to replace from a smallest structure of "⌈" and "⌋". During the first search, it can be found that the smallest "⌈" and "⌋" structure is ⌈B+'⌋ and ⌈'+C+'⌋. Since there are no character strings inside the ⌈B+'⌋ and ⌈'+C+'⌋, and there are only simple variable names, the variable names are first replaced with [%%0%%]. The reason for using [%%0%%] instead of [%%1%%] is to facilitate subsequently finding an outside smallest "⌈" and "⌋". A sentence 2 "'in SQL⌈'+(A?'([%%0%%] line)':")+'⌋ there is an illegal keyword [%%0%%]'" is obtained.

Then, looking for the smallest "⌈" and "⌋" structure in sentence 2, in this case ⌈'+(A?'([%%0%%] line)':")+'⌋ can be found, and there are character strings '([%%0%%] line)' and an empty character string ' ' inside the above structure. All [%%0%%] in the character strings '([%%0%%] line)' is replaced with ⌈%%i%%⌋, where i is a number that increments from 0, and the replaced '([%%0%%] line)' is extracted as the to-be-translated word.

The matched "⌈" and "⌋" structures ⌈'+(A?'([%%0%%] line)':")+'⌋ is replaced with [%%0%%] to obtain a sentence 3 "'in SQL[%%0%%] there is an illegal keyword [%%0%%]'".

Continuing to look for the smallest "⌈" and "⌋" structure, no such structure is found, which indicates that the is no nested "⌈" and "⌋" structure in this case, and all to-be-extracted words within the nested structure are extracted, so there is no need to continue to look for the "⌈" and "⌋" structure and the recursive logic ends.

Next, [%%0%%] in the sentence 3 with no nested structure is replaced with ⌈%%i%%⌋, where i is a number that increments from 0, and a sentence 4 "'in SQL ⌈%%0%%⌋ there is an illegal keyword ⌈%%1%%⌋'" is obtained. The sentence 4 is extracted as the to-be-translated words and the extraction logic ends.

It should be noted that in the embodiment shown in FIG. 2, the execution body may label the variables in the to-be-translated sentence, and then determine a foreign language sentence matching the labeled sentence from the set of sentence pairs.

Step 604 includes receiving translated foreign language sentences.

The execution body may receive translated foreign language sentences. Since the foreign language sentences are translated by the translator according to the labeled local language sentences, the translation results are more fluent and more in line with the context.

Step 605 includes adding the local language sentences and the corresponding foreign language sentences as sentence pairs into the set or sentence pairs.

Finally, the execution may add the local language sentences and the corresponding foreign language sentences as sentence pairs into the set or sentence pairs.

According to the method for outputting the information provided by the embodiment of the present disclosure, the manually translated foreign language sentences and the corresponding local language sentences are added into the set of sentence pairs as sentence pairs, thereby making the returned foreign language sentence more standard and fluent.

Figure 7:
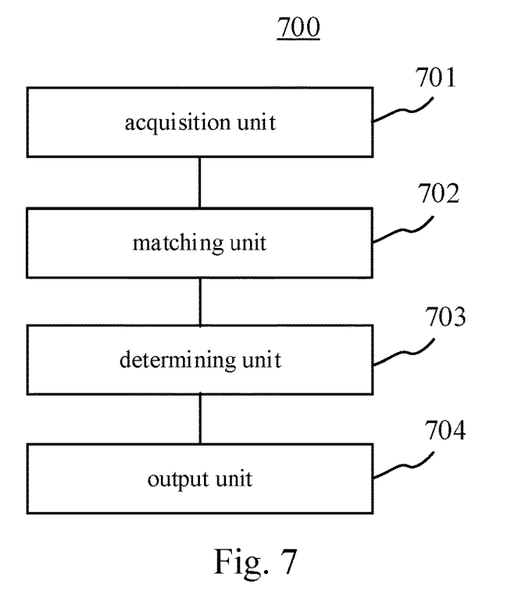
FIG. 7 is schematic structural diagram of an embodiment of an apparatus for outputting the information according to the present disclosure.

Further referring to FIG. 7, as an implementation of the method shown in each of the above figures, the present disclosure provides an embodiment of an apparatus for outputting the information, which corresponds to the method embodiment shown in FIG. 2. The apparatus may be specifically applied to various electronic devices.

As shown in FIG. 7, the apparatus 700 for outputting the information of this embodiment includes: an acquisition unit 701, a matching unit 702, a determining unit 703 and an output unit 704.

The acquisition unit 701 is configured to acquire a to-be-translated sentence.

The matching unit 702 is configured to determine a foreign language sentence matching the to-be-translated sentence from a preset set of sentence pairs, where the set of sentence pairs includes local language sentences and corresponding foreign language sentences.

The determining unit 703 is configured to determine a target foreign language sentence of the to-be-translated sentence according to the to-be-translated sentence and the determined foreign language sentence.

The output unit 704 is configured to output the target foreign language sentence.

In some alternative implementations of this embodiment, the matching unit 702 may further include (not shown in FIG. 7): a first determining module, a second determining module, a first matching module and a second matching module.

The first determining module is configured to determine a first variable and a first local language word in the to-be-translated sentence.

The second determining module is configured to determine second variables and second local language words in the local language sentences in the set of sentence pairs.

The first matching module is configured to determine a local language sentence matching the to-be-translated sentence from the set of sentence pairs according to the first variable, the first local language word, the second variables and the second local language words.

The second matching module is configured to use a foreign language sentence corresponding to the determined local language sentence as the foreign language sentence matching the to-be-translated sentence.

In some alternative implementations of this embodiment, the first matching module may be further configured to: determine first location information of the first variable in the to-be-translated sentence; determine second location information of the second variables in the local language sentences in the set of sentence pairs; and determine the local language sentence matching the to-be-translated sentence from the set of sentence pairs according to the first location information, the second location information, the first local language word and the second local language words.

In some alternative implementations of this embodiment, the determining unit 703 may further include (not shown in FIG. 7): a sentence segmentation module and a third determining module.

The sentence segmentation module is configured to segment the to-be-translated sentence to obtain at least two sub-sentences.

The third determining module is configured to determine foreign language sentences matching the at least two sub-sentences from the set of sentence pairs respectively.

In some alternative implementations of this embodiment, the sentence segmentation module is further configured to segment the to-be-translated sentence to obtain the at least two sub-sentences according to the first variable.

In some alternative implementations of this embodiment, the determining unit 703 is further configured to use the first variable to replace a second variable in the matched foreign language sentence to obtain the target foreign language sentence.

In some alternative implementations of this embodiment, the acquisition unit 701 is further configured to, in response to receiving a web page access request from a user, use a sentence in a web page targeted by the web page access request as the to-be-translated sentence.

In some alternative implementations of this embodiment, the apparatus 700 may further include an establishment unit (not shown in FIG. 7) configured to: acquire a local language sentence set; determine third variables and third local language words in the local language sentences in the local language sentence set; label the third variables in the local language sentences and output the labeled local language sentences for translating the third local language words in the local language sentences; receive translated foreign language sentences; and add the local language sentences and the corresponding foreign language sentences as sentence pairs into the set of sentence pairs.

It should be appreciated that the units 701 to 704 described in the apparatus 700 for outputting the information correspond to the respective steps described in the method of FIG. 2. Therefore, the operations and features described above for the method for outputting the information are also applicable to the apparatus 700 and the units thereof, and details are not described herein.

According to an embodiment of the present disclosure, the present disclosure provides an electronic device and a readable storage medium.

Figure 8:
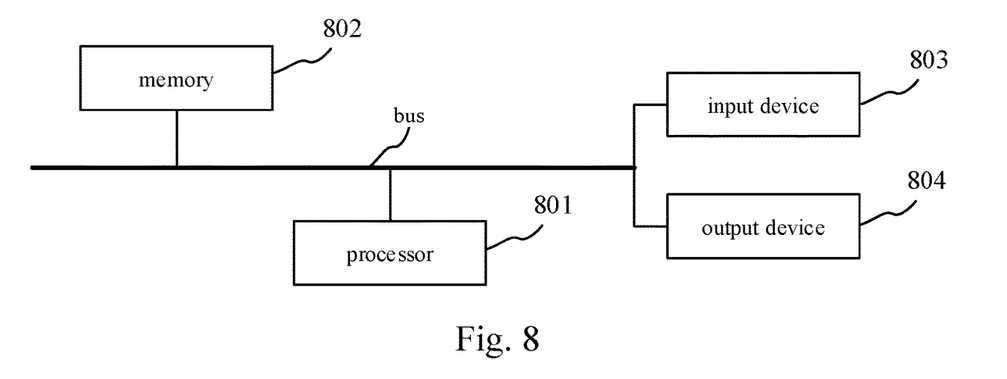
FIG. 8 is a block diagram of an electronic device for implementing the method for outputting the information according to an embodiment of the present disclosure.

As shown in FIG. 8, a block diagram of an electronic device for implementing the method for outputting the information of an embodiment of the present disclosure. The electronic devices is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 8, the electronic device includes one or more processors 801, a memory 802, and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected, each of which provides some of the necessary operations (for example, used as a server array, a set of blade servers, or a multiprocessor system). An example of a processor 801 is shown in FIG. 8.

The memory 802 is a non-transitory computer readable storage medium provided by the present disclosure. The memory stores instructions executable by at least one processor to cause the at least one processor to execute the method for outputting the information provided by the present disclosure. The non-transitory computer readable storage medium of the present disclosure stores computer instructions for causing a computer to execute the method for outputting the information provided by the present disclosure.

As a non-transitory computer readable storage medium, the memory 802 may be used to store non-transitory software programs, non-transitory computer executable programs and modules, such as the program instructions or modules corresponding to the method for outputting the information in the embodiment of the present disclosure (such as the acquisition unit 701, the matching unit 702, the determining unit 703 and the output unit 704 shown in FIG. 7). The processor 801 runs the non-transitory software programs, instructions and modules stored in the memory 802 to execute various functional applications and data processing of the server, thereby implementing the method for outputting the information in the method embodiment.

The memory 802 may include a storage program area and a storage data area, where the storage program area may store an operating system and an application program required by at least one function; and the storage data area may store data created by the electronic device when executing the method for outputting the information. In addition, the memory 802 may include a high-speed random access memory, and may further include a non-transitory memory, such as at least one magnetic disk storage device, a flash memory or other non-transitory solid state storage devices. In some embodiments, the memory 802 may alternatively include a memory disposed remotely relative to the processor 801, which may be connected through a network to the electronic device adapted to execute the method for outputting the information. Examples of such networks include, but are not limited to, the Internet, enterprise intranets, local area networks, mobile communication networks and combinations thereof.

The electronic device adapted to execute the method for outputting the information may further include an input device 803 and an output device 804. The processor 801, the memory 802, the input device 803 and the output device 804 may be interconnected through a bus or other means, and an example of a connection through a bus is shown in FIG. 8

The input device 803 may receive input number or character information, and generate key signal input related to user settings and functional control of the electronic device adapted to execute the method for outputting the information, such as a touch screen, a keypad, a mouse, a track pad, a touch pad, a pointer bar, one or more mouse buttons, a trackball, or a joystick. The output device 804 may include such as a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, Asics (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLOD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component, or front-end component. The components of the system may be interconnected by any form or medium of digital data communication (such as a communication network). Examples of communication networks include a local area network (LAN), a wide area network (WAN) and the Internet.

The computer system may include a client and a server. The client and the server are generally remote from each other and interact generally through a communication network. The relationship between the client and the server is generated by running the computer programs having a client-server relationship with each other on the corresponding computer.

According to the technical solutions of the embodiments of the present disclosure, the foreign language sentence matching the to-be-translated sentence is determined from the set of sentence pairs, and the foreign language sentence is optimized according to the to-be-translated sentence, so that the obtained target translation sentence is more fluent.

It should be appreciated that the steps of reordering, adding or deleting may be executed using the various forms shown above. For example, the steps described in the present disclosure may be executed in parallel or sequentially or in a different order, so long as the expected results of the technical solutions provided in the present disclosure may be realized, and no limitation is imposed herein.

The above specific description is not intended to limit the scope of the present disclosure. It should be appreciated by those skilled in the art that various modifications, combinations, sub-combinations and substitutions may be made according to design requirements and other factors. Any modification, equivalent replacement or improvement made within the spirit and principles of the present disclosure shall be included within the scope of the present disclosure.

What is claimed is:

1. A method for outputting information, the method comprising:
acquiring a to-be-translated sentence;
determining a foreign language sentence matching the to-be-translated sentence from a preset set of sentence pairs, wherein the set of sentence pairs comprises local language sentences and corresponding foreign language sentences, wherein the determining the foreign language sentence matching the to-be-translated sentence from the preset set of sentence pairs, comprises
determining a first variable and a first local language word in the to-be-translated sentence comprising the first variable,
determining second variables and second local language words in the local language sentences of the set of sentence pairs,
determining a local language sentence matching the to-be-translated sentence from the set of sentence pairs according to the first variable, the first local language word, the second variables and the second local language words, and
using a foreign language sentence corresponding to the determined local language sentence as the foreign language sentence matching the to-be-translated sentence;
determining a target foreign language sentence of the to-be-translated sentence according to the to-be-translated sentence and the determined foreign language sentence, wherein the determining the target foreign language sentence of the to-be-translated sentence according to the to-be-translated sentence and the determined foreign language sentence, includes replacing a second variable in the matched foreign language sentence with the first variable to obtain the target foreign language sentence comprising the first variable; and
outputting the target foreign language sentence.

2. The method according to claim 1, wherein the determining the local language sentence matching the to-be-translated sentence from the set of sentence pairs according to the first variable, the first local language word, the second variables and the second local language words, comprises:

determining first location information of the first variable in the to-be-translated sentence;
determining second location information of the second variables in the local language sentences of the set of sentence pairs; and
determining the local language sentence matching the to-be-translated sentence from the set of sentence pairs according to the first location information, the second location information, the first local language word and the second local language words.

3. The method according to claim 1, wherein the determining the foreign language sentence matching the to-be-translated sentence from the set of sentence pairs, comprises:
segmenting the to-be-translated sentence to obtain at least two sub-sentences; and
determining foreign language sentences matching the at least two sub-sentences from the set of sentence pairs respectively.

4. The method according to claim 3, wherein the segmenting the to-be-translated sentence to obtain at least two sub-sentences, comprises:
segmenting the to-be-translated sentence according to the first variable to obtain the at least two sub-sentences.

5. The method according to claim 1, wherein the acquiring the to-be-translated sentence, comprises:
using, in response to receiving a web page access request from a user, a sentence in a web page targeted by the web page access request as the to-be-translated sentence.

6. The method according to claim 1, wherein the set of sentence pairs is determined by:
acquiring a local language sentence set;
determining third variables and third local language words in the local language sentences of the local language sentence set;
labeling the third variables in the local language sentences and outputting the labeled local language sentences for translating the third local language words in the local language sentences;
receiving translated foreign language sentences; and
adding the local language sentences and the corresponding foreign language sentences as sentence pairs into the set of sentence pairs.

7. An electronic device for outputting information, the electronic device comprising:
at least one processor; and
a memory communicating with the at least one processor, wherein the memory stores instructions executable by the at least one processor, and the instructions, when executed by the at least one processor, cause the at least one processor to perform operations comprising:
acquiring a to-be-translated sentence;
determining a foreign language sentence matching the to-be-translated sentence from a preset set of sentence pairs, wherein the set of sentence pairs comprises local language sentences and corresponding foreign language sentences, wherein the determining the foreign language sentence matching the to-be-translated sentence from the preset set of sentence pairs, comprises
determining a first variable and a first local language word in the to-be-translated sentence comprising the first variable,
determining second variables and second local language words in the local language sentences of the set of sentence pairs,
determining a local language sentence matching the to-be-translated sentence from the set of sentence pairs according to the first variable, the first local language word, the second variables and the second local language words, and using a foreign language sentence corresponding to the determined local language sentence as the foreign language sentence matching the to-be-translated sentence;

determining a target foreign language sentence of the to-be-translated sentence according to the to-be-translated sentence and the determined foreign language sentence, wherein the determining the target foreign language sentence of the to-be-translated sentence according to the to-be-translated sentence and the determined foreign language sentence, includes replacing a second variable in the matched foreign language sentence with the first variable to obtain the target foreign language sentence comprising the first variable; and outputting the target foreign language sentence.

8. The electronic device according to claim 7, wherein the determining the local language sentence matching the to-be-translated sentence from the set of sentence pairs according to the first variable, the first local language word, the second variables and the second local language words, comprises:

determining first location information of the first variable in the to-be-translated sentence;

determining second location information of the second variables in the local language sentences of the set of sentence pairs; and determining the local language sentence matching the to-be-translated sentence from the set of sentence pairs according to the first location information, the second location information, the first local language word and the second local language words.

9. The electronic device according to claim 7, wherein the determining the foreign language sentence matching the to-be-translated sentence from the set of sentence pairs, comprises:

segmenting the to-be-translated sentence to obtain at least two sub-sentences; and determining foreign language sentences matching the at least two sub-sentences from the set of sentence pairs respectively.

10. The electronic device according to claim 9, wherein the segmenting the to-be-translated sentence to obtain at least two sub-sentences, comprises:

segmenting the to-be-translated sentence according to the first variable to obtain the at least two sub-sentences.

11. The electronic device according to claim 7, wherein the acquiring the to-be-translated sentence, comprises:

using, in response to receiving a web page access request from a user, a sentence in a web page targeted by the web page access request as the to-be-translated sentence.

12. The electronic device according to claim 7, wherein the set of sentence pairs is determined by:

acquiring a local language sentence set;

determining third variables and third local language words in the local language sentences of the local language sentence set;

labeling the third variables in the local language sentences and outputting the labeled local language sentences for translating the third local language words in the local language sentences;

receiving translated foreign language sentences; and adding the local language sentences and the corresponding foreign language sentences as sentence pairs into the set of sentence pairs.

13. A non-transitory computer readable storage medium storing computer instructions for causing a computer to perform operations comprising:

acquiring a to-be-translated sentence;

determining a foreign language sentence matching the to-be-translated sentence from a preset set of sentence pairs, wherein the set of sentence pairs comprises local language sentences and corresponding foreign language sentences, wherein the determining the foreign language sentence matching the to-be-translated sentence from the preset set of sentence pairs, comprises determining a first variable and a first local language word in the to-be-translated sentence comprising the first variable, determining second variables and second local language words in the local language sentences of the set of sentence pairs, determining a local language sentence matching the to-be-translated sentence from the set of sentence pairs according to the first variable, the first local language word, the second variables and the second local language words, and using a foreign language sentence corresponding to the determined local language sentence as the foreign language sentence matching the to-be-translated sentence;

determining a target foreign language sentence of the to-be-translated sentence according to the to-be-translated sentence and the determined foreign language sentence, wherein the determining the target foreign language sentence of the to-be-translated sentence according to the to-be-translated sentence and the determined foreign language sentence, includes replacing a second variable in the matched foreign language sentence with the first variable to obtain the target foreign language sentence comprising the first variable; and outputting the target foreign language sentence.

14. The storage medium e according to claim 13, wherein the determining the local language sentence matching the to-be-translated sentence from the set of sentence pairs according to the first variable, the first local language word, the second variables and the second local language words, comprises:

determining first location information of the first variable in the to-be-translated sentence;

determining second location information of the second variables in the local language sentences of the set of sentence pairs; and determining the local language sentence matching the to-be-translated sentence from the set of sentence pairs according to the first location information, the second location information, the first local language word and the second local language words.

15. The storage medium according to claim 13, wherein the determining the foreign language sentence matching the to-be-translated sentence from the set of sentence pairs, comprises:

segmenting the to-be-translated sentence to obtain at least two sub-sentences; and determining foreign language sentences matching the at least two sub-sentences from the set of sentence pairs respectively.

16. The method according to 1, wherein the first variable is a parameter in a computer programming program.

17. The method according to claim 16, the computer programming program is JavaScript, and the first variable is a parameter that not represented in a single quotation mark in JavaScript.

* * * * *